US006886398B2

(12) United States Patent
Tsuyuki et al.

(10) Patent No.: US 6,886,398 B2
(45) Date of Patent: May 3, 2005

(54) MONITORING OF FUEL VAPOR PRESSURE

(75) Inventors: Takeshi Tsuyuki, Yokohama (JP); Takashi Aramaki, Kawasaki (JP); Masato Kobayashi, Yokohama (JP); Hiroya Ishii, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/642,622

(22) Filed: Aug. 19, 2003

(65) Prior Publication Data

US 2004/0064244 A1 Apr. 1, 2004

(30) Foreign Application Priority Data

Sep. 26, 2002 (JP) ....................................... 2002-280628

(51) Int. Cl.[7] ............................................... G01M 15/00

(52) U.S. Cl. ..................................................... 73/118.1

(58) Field of Search ................................ 73/116, 117.2, 73/117.3, 118.1, 119 A; 701/29, 101, 102, 103; 340/438, 439

(56) References Cited

U.S. PATENT DOCUMENTS 6,651,631 B2 * 11/2003 Hayashi et al. ............. 123/520
2002/0129643 A1 * 9/2002 Yamaguchi et al. ......... 73/49.7
2002/0193936 A1 * 12/2002 Saito et al. ................. 701/114

FOREIGN PATENT DOCUMENTS

JP 6-159157 A 6/1994
JP 10-274107 A 10/1998

* cited by examiner

*Primary Examiner*—Eric S. McCall
(74) *Attorney, Agent, or Firm*—Foley & Lardner LLP

(57) ABSTRACT

Fuel vapor in a fuel tank (1) is purged into an intake passage (8) of an engine (10) through a purge vent (2, 4, 6). The controller (21) determines whether a leak is present in a purge vent from the fuel tank (1) to a purge control valve (11). The determination process comprises a pull-down process in which a pressure in the purge vent is reduced using a negative pressure in the intake passage (8) and a leak-down process of sealing the purge vent at the reduced pressure and monitoring the pressure variation. The controller (21) calculates an error equivalence amount (DVPII), a pressure component corresponding to sloshing in the fuel tank (1) during the leak-down process, and determines the presence of a leak in a highly accurate manner based a corrected pressure (DVP5A) in which the monitored pressure variation is corrected using the error equivalence amount (DVPII) (S22).

16 Claims, 14 Drawing Sheets

FIG. 5A
FIG. 5B
FIG. 5C
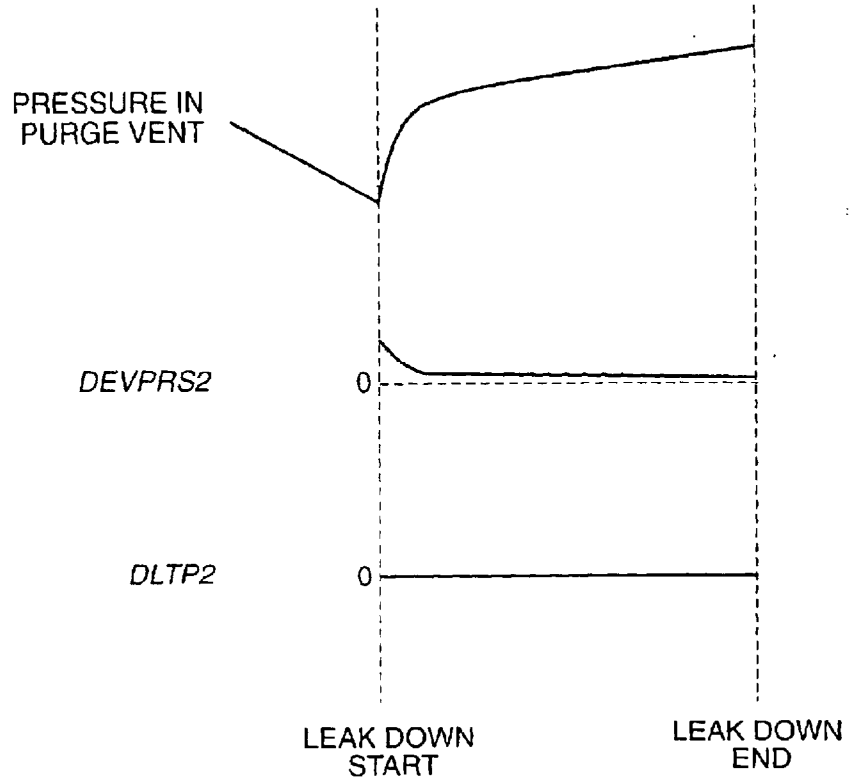
FIG. 5D
FIG. 5E
FIG. 5F
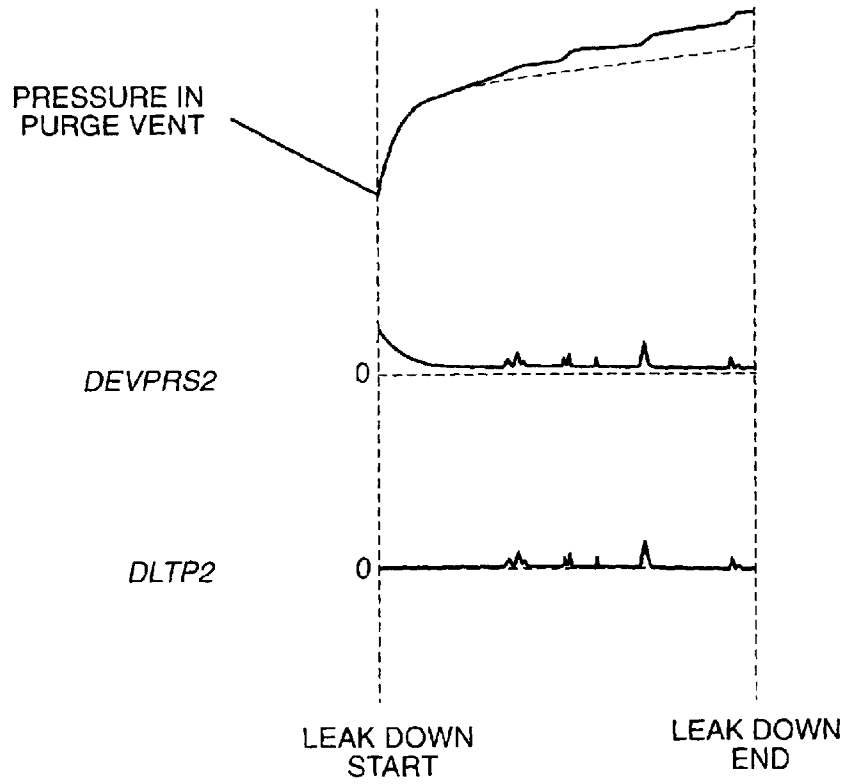

MONITORING OF FUEL VAPOR PRESSURE

FIELD OF THE INVENTION

This invention relates to monitoring of a fuel vapor pressure in a fuel vapor purge vent in a vehicle.

BACKGROUND OF THE INVENTION

Tokkai 6-159157 published by the Japan Patent Office in 1994 discloses a fuel vapor processing device which avoids adverse effects resulting from sloshing on leak diagnosis in a fuel vapor purge vent in a vehicle by suspending leak diagnosis when sloshing occurs.

Sloshing refers to splashing of liquid fuel or inclination of the surface of the liquid fuel in a vehicle fuel tank.

The fuel vapor purge vent comprises a canister absorbing fuel particles from fuel vapor, a passage from the fuel tank to the canister and a passage from the canister to the intake passage for an internal combustion engine. Leaks are diagnosed based on pressure variation after closing the purge vent that was previously regulated to a pressure lower than the atmospheric pressure using the intake negative pressure of the engine intake manifold.

When sloshing occurs during leak diagnosis, the fuel vapor in the fuel tank increases rapidly. As a result, leak diagnosis can not be accurately performed due to the increase in the pressure in the purge vent. Therefore a prior art technique uses pressure variation in the fuel tank to detect onset of sloshing and suspends leak diagnosis while sloshing occurs.

SUMMARY OF THE INVENTION

Leak diagnosis comprises a pull-down period to induce negative pressure in the purge vent and a consecutive leak-down monitoring period to monitor pressure variation after closing the purge vent.

The prior art technique determines the sloshing period based on pressure variation in the fuel tank when sloshing occurs in the pull-down period as described below. Specifically, sloshing in the pull-down period is indicated by a sudden pressure increase in the fuel tank in the course of a reduction in pressure due to the pull-down operation.

When sloshing stops, the fuel tank pressure commences to fall again. The onset of sloshing is taken to be the point in time when the pressure starts to rise in the course of pressure reduction during the pull-down period. The sloshing period is defined as the period from the onset of sloshing until when the pressure increase due to sloshing falls to the pressure when the sloshing started.

However this pattern is not seen when sloshing occurs in the leak-down monitoring period, because the pressure increases in the leak-down monitoring period. The prior art technique merely suspends the performance of leak diagnosis when sloshing occurs during the pull-down period and is not able to cope with sloshing occurring other than in the pull-down period.

It is therefore an object of this invention to eliminate the effect of sloshing during the leak-down monitoring period or during similar operations.

In order to achieve the above object, this invention provides a fuel vapor pressure monitoring device monitoring a pressure increase in a purge vent between a fuel tank and an intake passage of an engine, in a sealed state. The device comprises a sensor which detects a pressure in the purge vent, and a programmable controller programmed to calculate a pressure variation in the purge vent, calculate an error equivalence amount from the pressure variation in the purge vent, and calculate a corrected pressure which corresponds to a pressure when sloshing does not occur, from the pressure in the purge vent in the sealed state and the error equivalence amount. Herein, the error equivalence amount corresponds to an error amount in the pressure in the purge vent in the sealed state due to sloshing in the fuel tank.

This invention also provides a fuel vapor pressure monitoring method monitoring a pressure increase in a purge vent between a fuel tank and an intake passage of an engine, in a sealed state. The method comprises determining a pressure in the purge vent, calculating a pressure variation in the purge vent, calculating an error equivalence amount from the pressure variation in the purge vent, and calculating a corrected pressure which corresponds to a pressure when sloshing does not occur, from the pressure in the purge vent in the sealed state and the error equivalence amount.

The details as well as other features and advantages of this invention are set forth in the remainder of the specification and are shown in the accompanying drawings.

BRIEF DESCRIPTION OF THE DRAWINGS

FIGS. 5A–5F are timing charts showing the pressure variation due to sloshing in a leak down monitoring period in comparison with the case when there is no sloshing.

DESCRIPTION OF THE PREFERRED EMBODIMENTS

Figure 1:
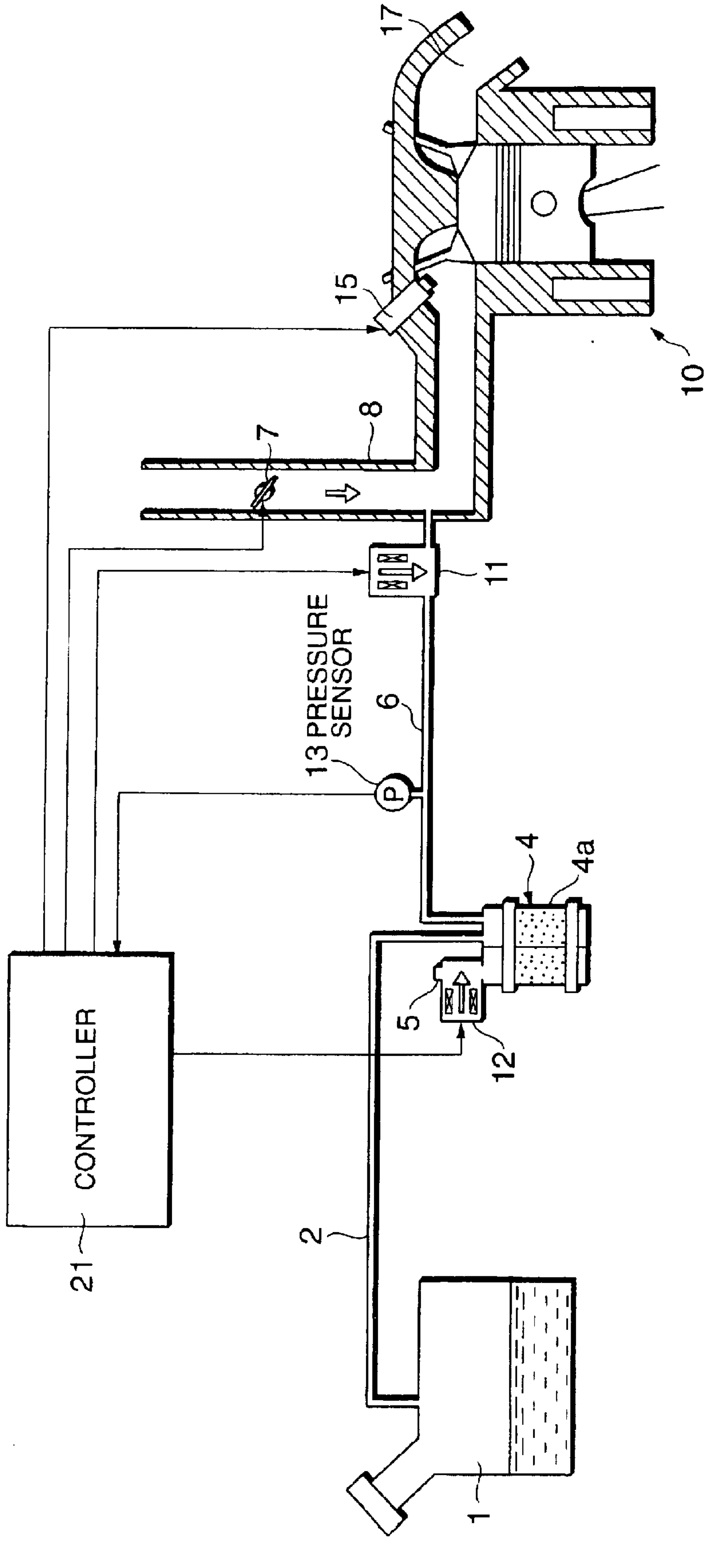
FIG. 1 is a schematic diagram of a fuel vapor processing device according to this invention.

Referring to FIG. 1 of the drawings, an internal combustion engine 10 mounted in a vehicle combusts a gaseous mixture of fuel supplied through a fuel injector 15 from a fuel tank 1 and air supplied from an intake passage 8. Exhaust gas is discharged from the exhaust passage 17. The intake air amount of the intake passage 8 is controlled by a throttle 7.

A first passage 2 recirculating fuel vapor in the fuel tank 1 to a canister 4 is connected to the upper section of the fuel tank 1.

Fuel vapor flowing into the canister 4 from the first passage 2 passes through a filter 4*a* comprising activated carbon. Fuel particles are removed by the filter 4*a* and are discharged into the atmosphere as a non-toxic gas from a vent hole 5 via a drain cut valve 12. The drain cut valve 12 is a solenoid which is normally in the open position.

A second passage 6 is connected to the canister 4. The second passage 6 purges fuel particles adhering to the filter 4*a* into the intake passage 8 of the engine 10.

The fuel particles adhering to the filter 4*a* are drawn from the filter 4*a* by a negative intake pressure of the engine 10 and by air flowing from the vent hole 5 in response to a negative intake pressure.

The particles thus drawn into the second passage 6 become mixed with intake air in the intake passage 8. A purge valve 11 driven by a step motor is provided in the second passage 6.

A controller 21 controls the opening and closing of the drain cut valve 12 and purge valve 11 as well as the fuel injection operations of the fuel injector 15 and an opening of the throttle 7.

The controller 21 performing the above control comprises a microcomputer provided with a central processing unit (CPU), a read-only memory (ROM), a random access memory (RAM) and an input/output interface (I/O interface). The controller 21 may comprise a plurality of microcomputers.

The controller 21 performs a leak diagnosis operation each time the engine is operated. The leak diagnosis operation determines whether or not a leak has occurred in the fuel vapor purge vent extending from the fuel tank 1 to the intake passage 8.

Figure 2:
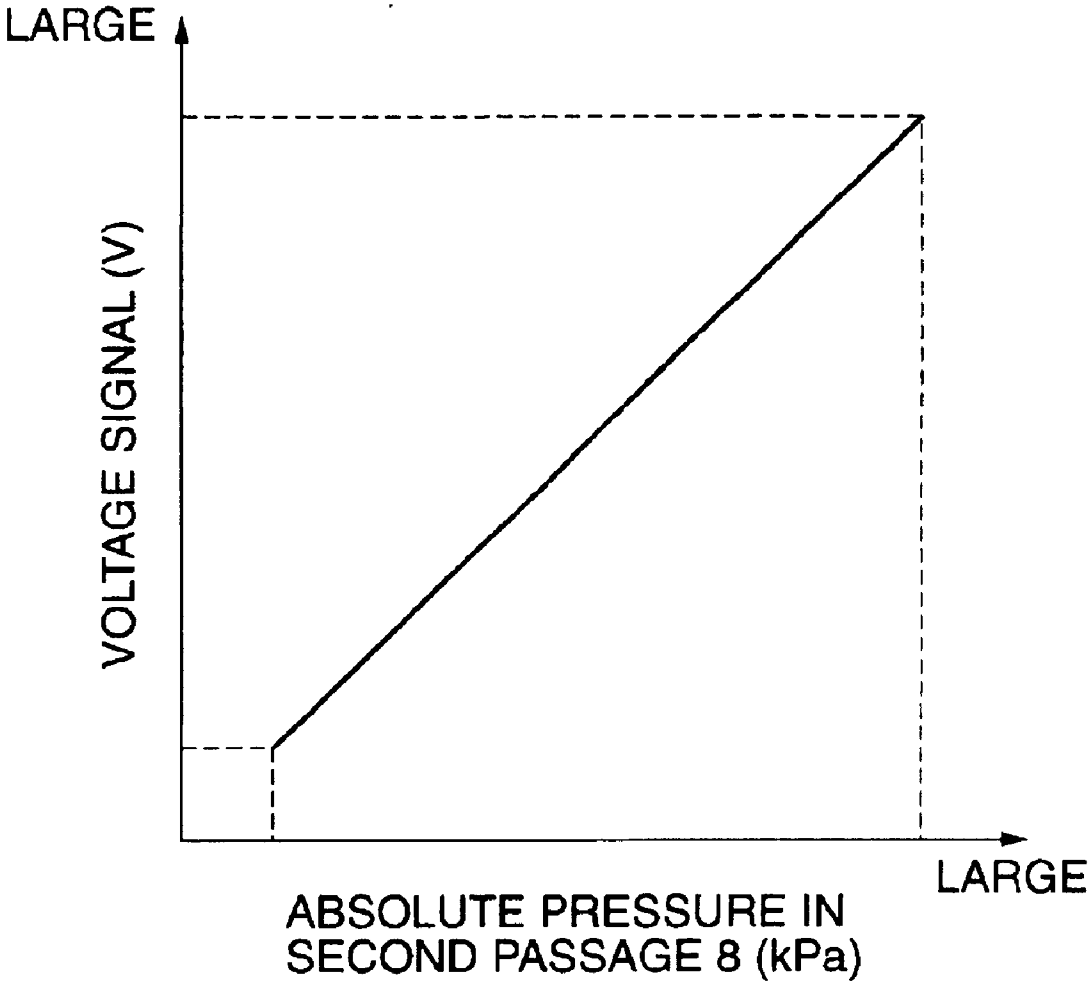
FIG. 2 is a diagram showing the output characteristics of a pressure sensor according to this invention.

A pressure sensor 13 detecting the pressure in the second passage 6 is provided for leak diagnosis and vapor control operations which are executed by the controller 21. Referring to FIG. 2, the pressure sensor 13 inputs a voltage signal into the controller 21 which is proportional to the absolute pressure in the second passage 6.

Referring to FIGS. 3A–3C and FIGS. 4A–4C, the basic algorithm for leak diagnosis operations will be described. This algorithm forms part of the prior art technique. In the following description, all the pressure and pressure difference values are expressed as absolute values.

(1) Pull-down Process a) When leak diagnosis has not yet been performed after startup of the engine 10 and the negative pressure in the intake passage 8 has sufficiently developed during purging the controller 21 determines that leak diagnosis conditions are satisfied. The level of the negative pressure in the intake passage 8 is defined to be sufficiently developed when the negative pressure in the intake passage 8 is less than atmospheric pressure minus 39.9 kilopascals (kPa).

Figures 3A, 3B, 3C:
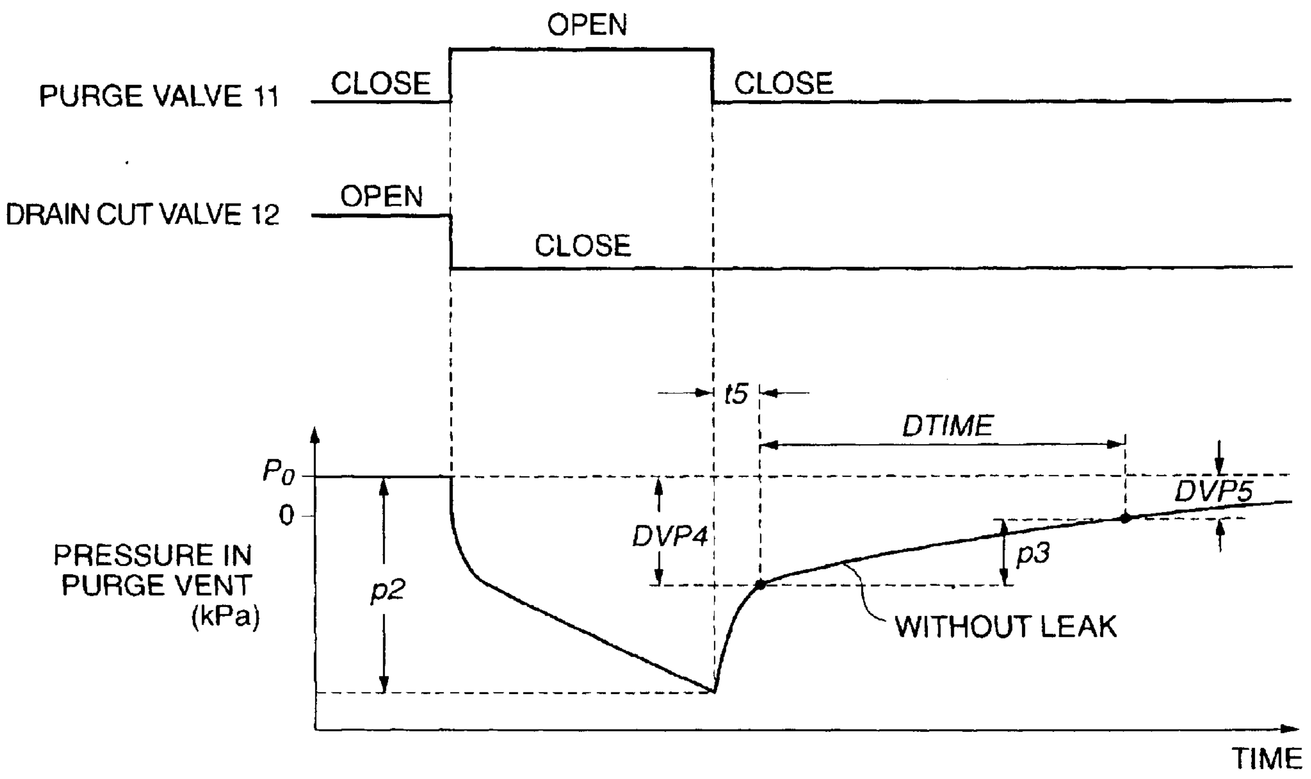
FIG. 3A PRIOR ART
FIG. 3B PRIOR ART
FIG. 3C PRIOR ART
FIGS. 3A–3C are timing charts showing the relationship between pressure variation and the valve operation when there is no leak, according to a prior art leak diagnosis algorithm.
Figures 4A, 4B, 4C:
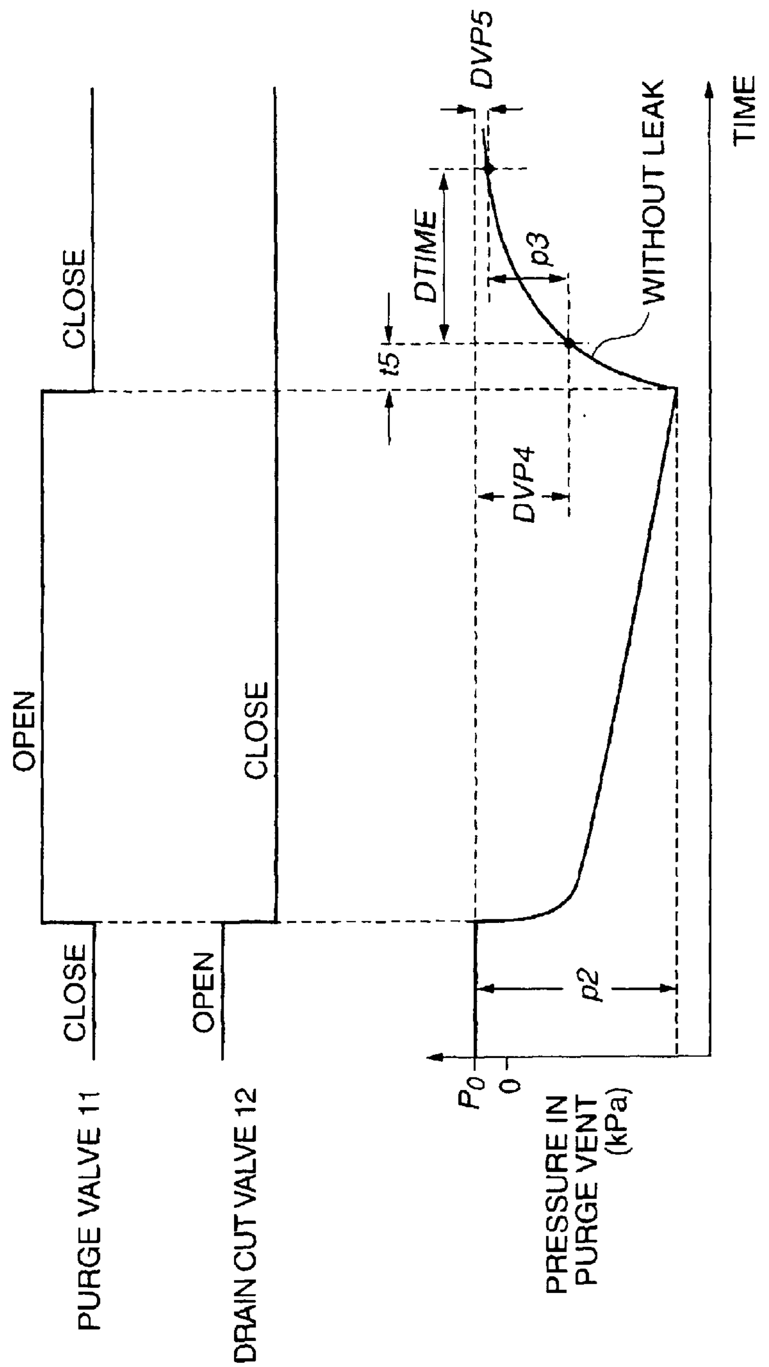
FIG. 4A PRIOR ART
FIG. 4B PRIOR ART
FIG. 4C PRIOR ART
FIGS. 4A–4C are timing charts showing the relationship between pressure variation and the valve operation when there is a leak, according to the prior art leak diagnosis algorithm.

As shown in FIG. 3A and FIG. 4A, when leak diagnosis conditions are satisfied, the controller 21 closes the purge control valve 11 and temporarily stops purging. On the other hand, as shown in FIG. 3B and FIG. 4B, since the drain cut valve 12 is open in this situation, the purge vent from the fuel tank 1 to the purge control valve 11 is communicated with the atmosphere. The detected pressure P of the pressure sensor 13 under these conditions is stored as an initial pressure P0 which is shown in FIG. 3C and FIG. 4C.

b) Next, as shown in FIG. 3A and FIG. 4A, the drain cut valve 12 is closed and the purge control valve 11 is opened. As a result, the pressure in the purge vent between the fuel tank 1 and the intake passage 8 is decreased as shown in FIG. 3C and FIG. 4C by the negative pressure in the intake passage 8 downstream of the throttle 7.

c) When the difference P0–P of the initial pressure P0 and the detected pressure P is greater than or equal to a fixed pressure p2, as shown in FIG. 3A and FIG. 4A, the controller 21 closes the purge control valve 11. The fixed pressure p2 is preferably set to a value within a range from 2 kPa to 3 kPa.

The pull-down process is terminated at this point. During the pull-down process, the pressure in the intake passage 8 downstream of the throttle 7 must be maintained at a negative pressure greater than or equal to a fixed magnitude.

(2) Leak-down Process a) After the purge control valve 11 is closed, the pressure difference P0–P is calculated during the fixed time lag t5 as shown in FIG. 3C and FIG. 4C. The time lag t5 has the function of preventing gas flow in the purge vent and of waiting for the pressure loss to dissipate. The time lag t5 is preferably set to a value between 3 seconds and 5 seconds. The controller 21 reads the pressure difference P0–P when the time lag t5 elapses and stores the result as a leak-down process initial pressure DVP4 (kPa) in the memory (RAM). The leak-down process initial pressure DVP4 (kPa) expresses the actual pressure loss in the purge vent resulting from the pull-down process.

b) As shown in FIG. 3C and FIG. 4C, when the pressure difference P0–P decreases to the leak-down processing initial pressure DVP4 minus a fixed pressure p3, the controller 21 stores the pressure difference P0–P in the memory (RAM) as a leak-down processing final pressure DVP5. The required time for the pressure difference P0–P to vary from the leak-down processing initial pressure DVP4 to the leak-down processing final pressure DVP5 is stored in the memory (RAM) as a leak-down period DTIME (second). The fixed pressure p3 is preferably set to a value between 0.5 kPa and 2.0 kPa.

c) The controller 21 measures the difference of the leak-down processing initial pressure DVP4 and the leak-down processing final pressure DVP5. In other words, it calculates a leak diagnosis index DVPBT by dividing the fixed pressure p3 with the leak-down period DTIME. Then the controller 21 compares the leak diagnosis index DVPBT with a slice level SL2. If the leak diagnosis index DVPBT is greater than the slice level SL2, the presence of a leak is determined. The slice level SL2 is preferably set within a range from 0.8 kPa to 1.1 kpa.

FIGS. 3A–3C show a typical pattern when a leak is present. FIGS. 4A–4C show a typical pattern when a leak is not present.

In this invention in addition to the basic leak diagnosis algorithm, leak diagnosis is performed using an algorithm taking into account the effect of sloshing during the leak-down period.

Referring to FIGS. 5A–5F, the diagnosis algorithm will be described. FIGS. 5A–5C show the pressure P in the leak-down period when sloshing does not occur, a pressure change rate DEVPRS2 and a sloshing equivalence pressure change rate DLTP2 which is a sloshing component within the pressure change rate DEVPRS2. FIGS. 5D–5F show the pressure P in the leak-down period when sloshing occurs, the pressure change rate DEVPRS2 and the sloshing equivalence pressure change rate DLTP2.

As shown by FIG. 5A, in the leak-down period if sloshing does not occur, the purge vent pressure P increases as a function of time irrespective of whether there is a leak or not. The pressure change rate DEVPRS2 decreases as a function of time as shown in FIG. 5B. As shown in FIG. 5C, the sloshing equivalence pressure change rate DLTP2 when sloshing does not occur naturally takes a value of zero.

In the leak-down period, when sloshing occurs, the rate of generation of fuel vapor in the fuel tank 1 undergoes a transient increase. When sloshing decreases, the rate of generation of fuel vapor decreases and returns to the value before sloshing. Consequently as shown in FIG. 5E, sloshing is indicated by the wave-shaped projections in the curve for the pressure change rate DEVPRS2. As shown in FIG. 5F, the sloshing equivalence pressure change rate DLTP2 undergoes a temporary increase. Thus as shown in FIG. 5D, the purge vent pressure P is always larger than the purge vent pressure when sloshing does not occur which is shown by the broken line in the figure.

If leak diagnosis is performed using the algorithm for non-sloshing conditions when sloshing is actually occurring, an error corresponding to the difference of the solid line and the broken line in FIG. 5D is incorporated to the pressure difference P0–P and the accuracy of leak diagnosis becomes adversely affected.

In order to eliminate such an error, this invention calculates the pressure change rate resulting from sloshing during the leak-down process. Thus during the leak-down period, the amount of variation per unit time for the purge vent pressure P in the purge vent is calculated repeatedly as the pressure change rate DEVPRS2. Herein, the unit time is defined as two seconds and the calculation interval is defined as a hundred milliseconds.

Furthermore the controller 21 updates the minimum value EVLKMN2 for the pressure change rate DEVPRS2 on each calculation cycle. As shown in FIG. 5B, the pressure change rate DEVPRS2 decreases as a function of time when sloshing does not occur. Thus the minimum value EVLKMN2 for the pressure change rate takes the value of the latest value for the pressure change rate DEVPRS2. As shown in FIG. 5C, when sloshing occurs, the pressure change rate DEVPRS2 temporarily starts to increase.

In each calculation cycle, the controller 21 compares the pressure change rate DEVPRS2 with the minimum value EVLKMN2 for the pressure change rate up to that time. The smaller of the two values is updated as the new minimum value EVLKMN2.

Next referring to FIG. 6A–6E, the calculation algorithm for the sloshing correction amount DVPIGL2 using the pressure change rate DEVPRS2 and the minimum value EVLKMN2 for the pressure change rate will be described.

Figures 6A, 6B, 6C, 6D, 6E:
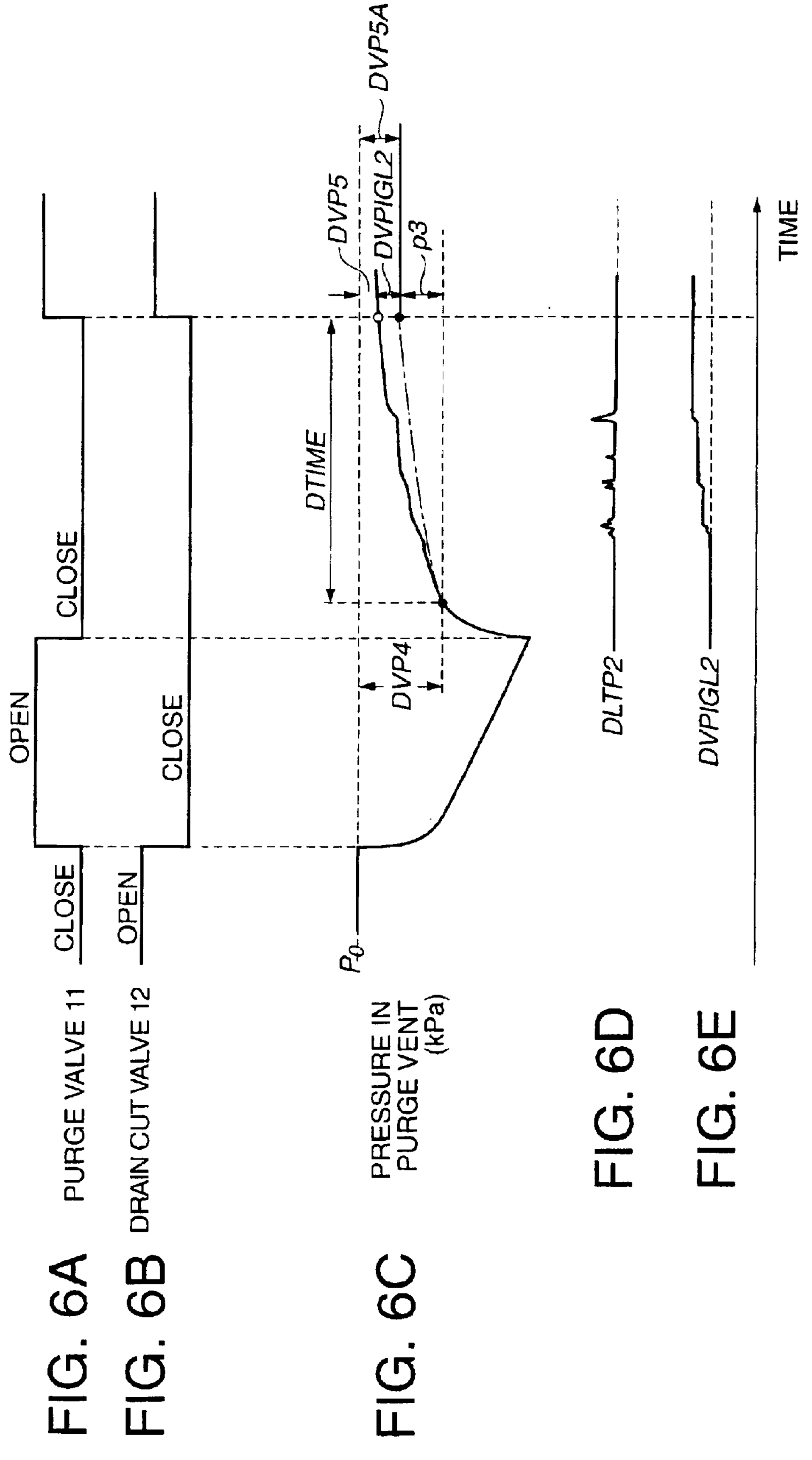
FIGS. 6A–6E are timing charts showing a correction for sloshing according to this invention.

As shown in FIG. 6D, the controller 21 calculates the difference of the pressure change rate DEVPRS2 and the minimum value EVLKMN2 for the pressure change rate as the sloshing equivalence pressure change rate DLTP2. As shown in FIG. 6E, the controller 21 sums the sloshing equivalence pressure change rate DLTP2 over time in order to calculate the sloshing correction amount DVPIGL2. The sloshing correction amount DVPIGL2 is the error equivalence amount attributable to sloshing and is related to the pressure variation in the purge vent which is sealed from the fuel tank 1 to the purge control valve 11.

As shown in FIG. 6C, the controller 21 determines that the leak-down process is completed when the pressure difference P0–P equals the leak-down processing initial pressure DVP4 minus the fixed pressure p3 minus the sloshing correction amount DVPIGL2. The pressure difference P0–P at this time is taken as the leak-down processing final pressure DVP5. A value calculated by subtracting the sloshing correction amount DVPIGL2 from the leak-down processing final pressure DVP5 is calculated as the leak-down processing final pressure correction DVP5A.

In subsequent steps, leak diagnosis follows the same steps as the leak diagnosis process when sloshing does not occur. In other words, the leak diagnosis index DVPBT is calculated by dividing the difference of the leak-down processing initial pressure DVP4 and the leak-down processing final pressure correction DVP5A, namely the fixed pressure p3, by the leak-down period DTIME. The controller 21 determines the presence of a leak if the leak diagnosis index DVPBT is greater than the slice level SL2.

Referring to FIG. 7, FIGS. 8A and 8B and FIG. 9, the routines executed by the controller 21 in order to realize the algorithm above will be described.

Figure 7:
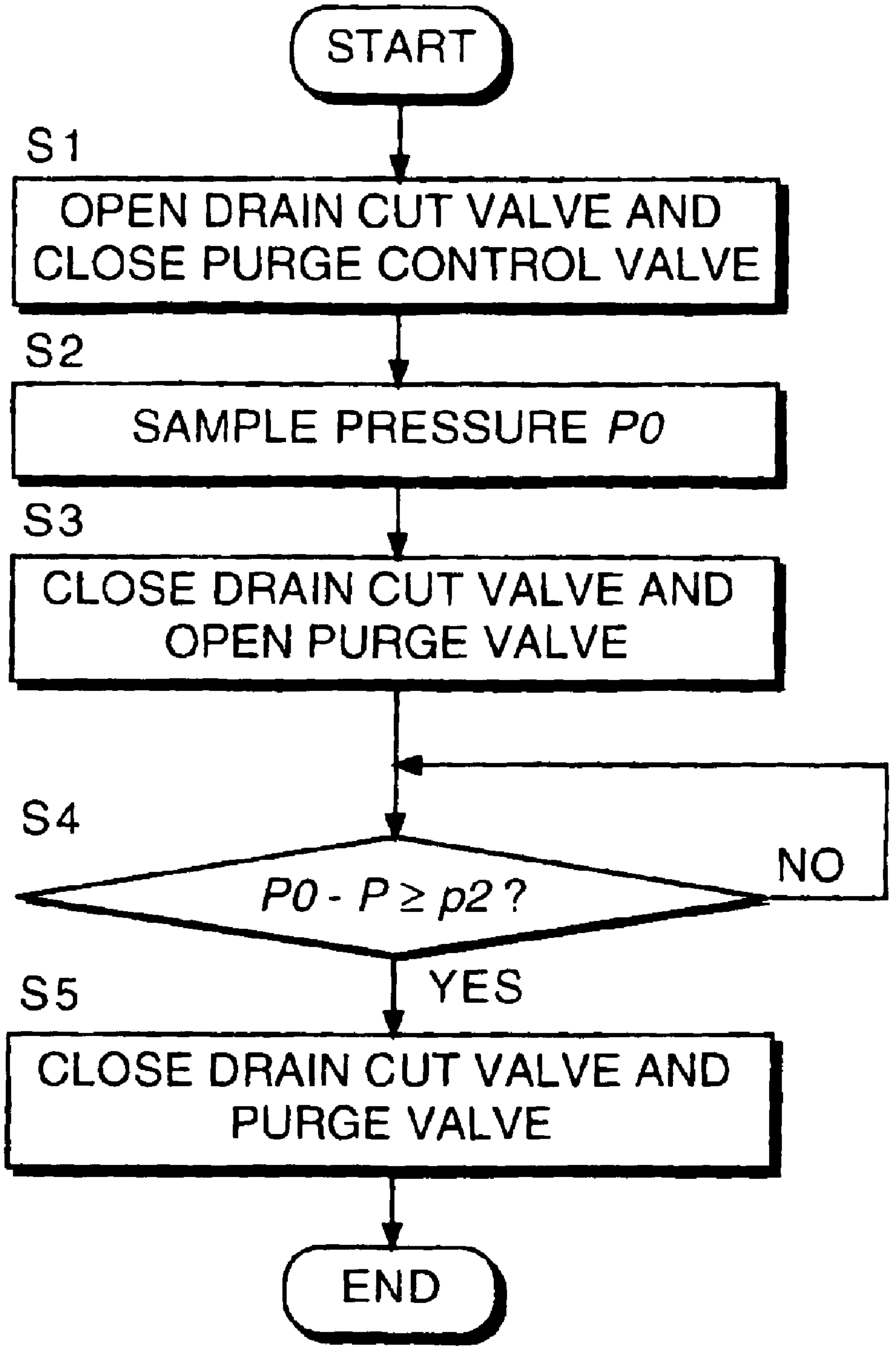
FIG. 7 is a flowchart describing a pull-down processing routine executed by a controller according to this invention.

FIG. 7 shows a pull-down processing routine. This routine is executed only once when the leak diagnosis conditions are satisfied while the engine 10 is operating. The leak diagnosis conditions require that the negative pressure in the intake passage 8 satisfies the condition shown in (1)*a*) above and that neither a leak diagnosis suspension flag nor a leak diagnosis termination flag have a value of unity. These flags are described later.

Firstly in a step S1, the controller 21 opens the drain cut valve 12 and the purge control valve 11.

Next in a step S2, the detected pressure from the pressure sensor 13 is stored in the memory (RAM) as an initial pressure P0.

In a step S3, the controller 21 closes the drain cut valve 12 and maintains the purge control valve 11 in an open state.

Thereafter in a step S4, the controller 21 determines whether or not the pressure difference P0–P is greater than or equal to a fixed pressure p2. Wherein the pressure difference P0–P is less than the fixed pressure p2, the process in the step S4 is repeated at a fixed time interval until the pressure difference P0–P is greater than or equal to a fixed pressure p2. The controller 21 executes the process in a step S5 when the pressure difference P0–P is greater than or equal to a fixed pressure p2. The fixed pressure p2 is herein defined as 1.33 kilopascals (kPa).

In the step S5, the controller 21 closes the purge control valve 11. After the process in the step S5, the controller 21 terminates the routine.

Figure 8A:
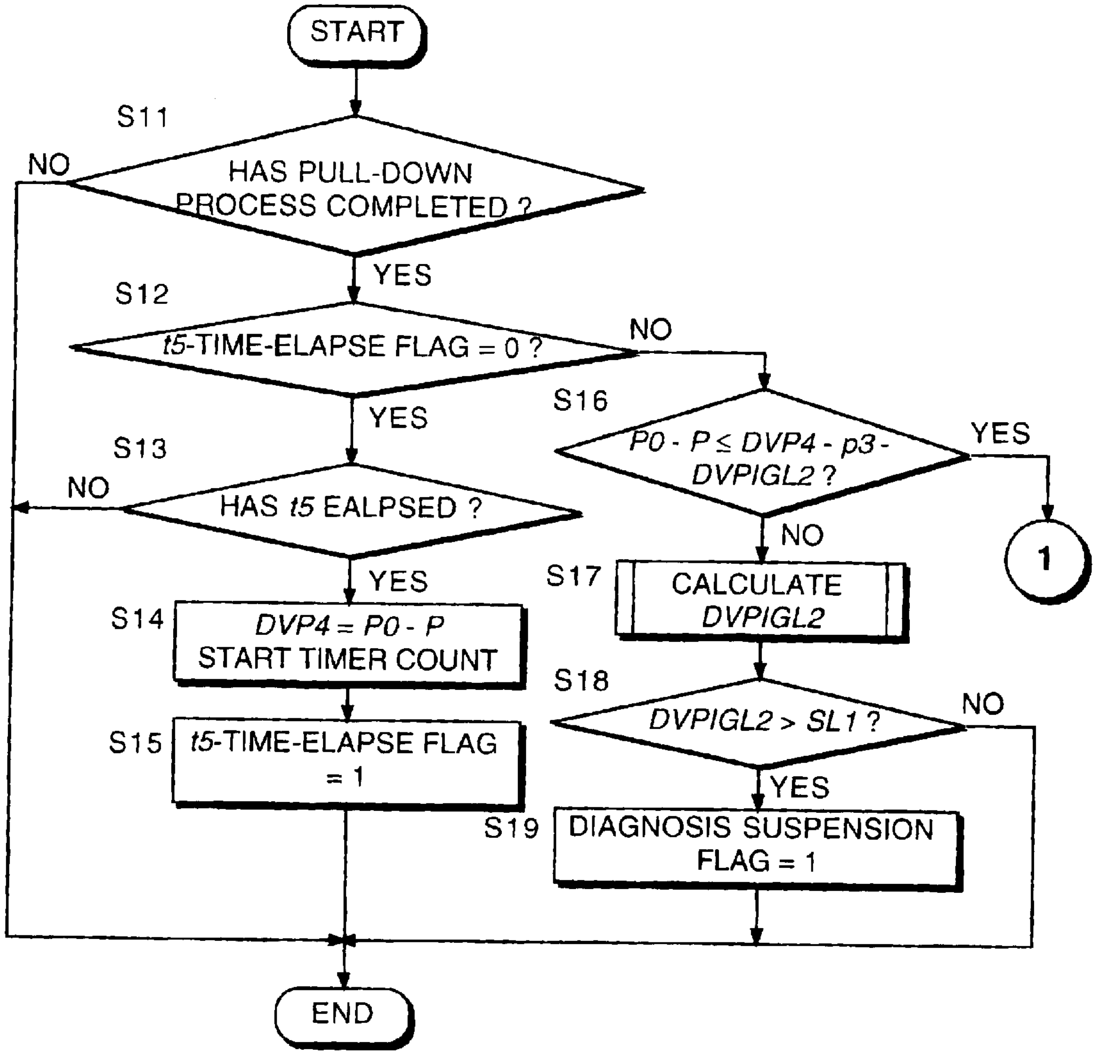
FIGS. 8A and 8B are a flowchart describing a leak-down processing routine executed by the controller.
Figure 8B:
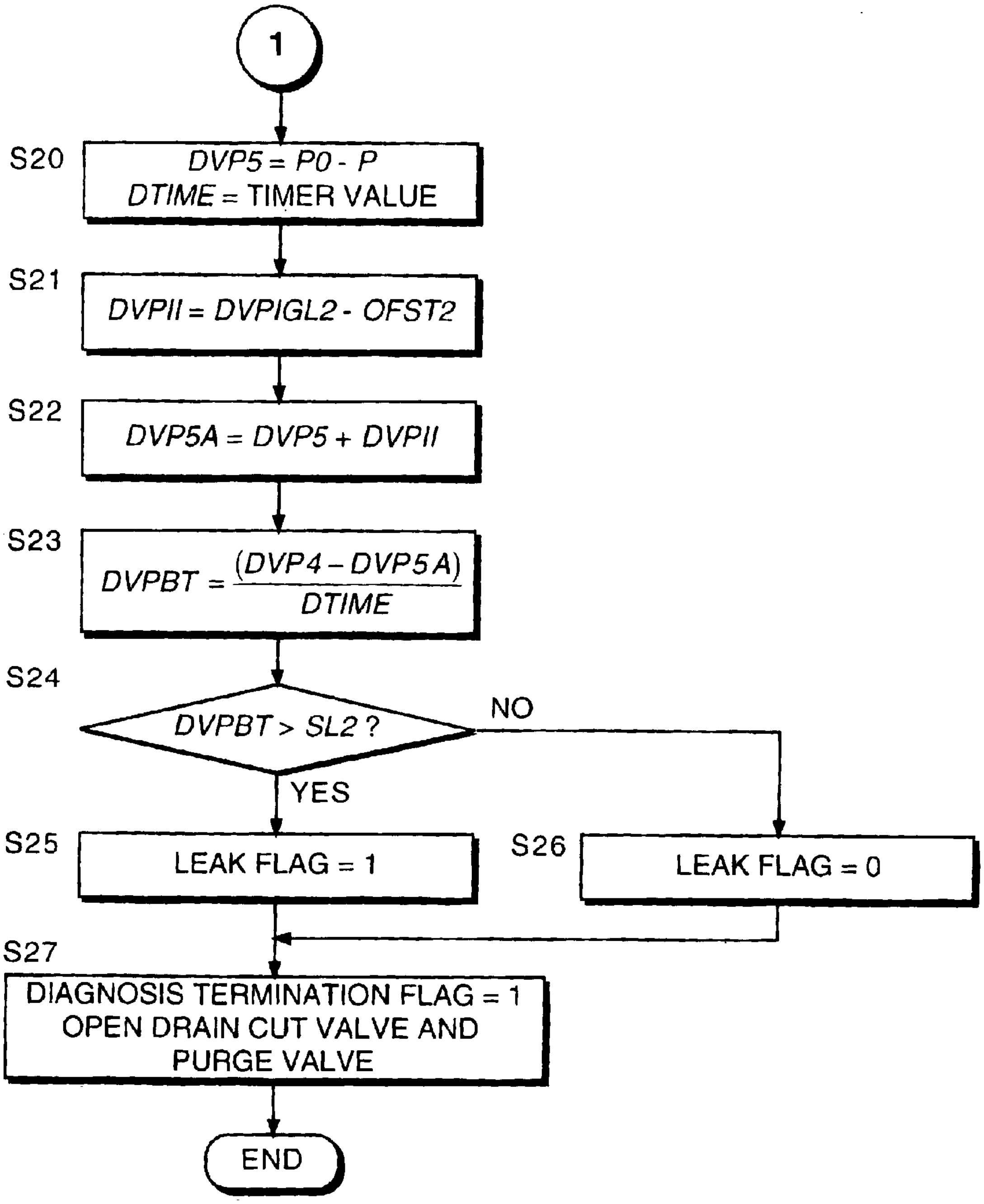

FIGS. 8A and 8B show a leak-down processing routine. This routine is executed when the leak diagnosis conditions are satisfied. It is executed at a time interval of a hundred milliseconds which represents the execution period for the above calculation.

Firstly in a step S11, the controller 21 determines whether or not the pull-down processing routine is completed. Since leak diagnosis is performed after the pull-down process is complete, when the pull-down process is not complete, the controller 21 terminates the routine without proceeding to other steps.

When the pull-down process is completed in the step S11, in a step S12, the controller 21 determines whether or not a t5-time-elapse flag is zero. The t5-time-elapse flag is a flag which shows whether or not the time lag t5 has elapsed after the start of the leak-down period. The flag has an initial value of zero.

When the t5-time-elapse flag has a value of zero, in a step S13, the controller 21 determines whether or not the time lag t5 has elapsed after the start of the leak-down process during this execution cycle. If the time lag t5 has not elapsed, the controller 21 terminates the routine without performing other steps. On the other hand, when the time lag t5 has elapsed after the start of the leak-down process, in a step S14, the controller 21 stores the pressure difference P0–P as a leak-down processing initial pressure DVP4 in the memory (RAM). At the same time; the internal timer is activated and a summation of the timer value is started.

In a following step S15, the controller 21 terminates the routine after setting the t5-time-elapse flag to a value of unity.

When, in the step S12, the t5-time-elapse flag does not have a value of zero, in other words, when the flag has a value of unity, it means that the current time is in a period corresponding to the leak-down period DTIME as shown in FIG. 6C.

In this situation, the controller 21 determines whether or not the pressure difference P0–P is less than or equal to DVP4–p3–DVPIGL2. The initial value of DVPIGL2 is zero.

When the determination result in the step S16 is affirmative, it means that the leak-down period DTIME in FIG. 6C has elapsed. In this case, the controller 21 performs the process in the steps S20–S27 as shown in FIG. 8B. When the determination result in the step S16 is negative, it means that the leak-down period DTIME in FIG. 6C is still current. In this case, the controller 21 performs the steps S17–S19 in FIG. 8A.

Figure 9:
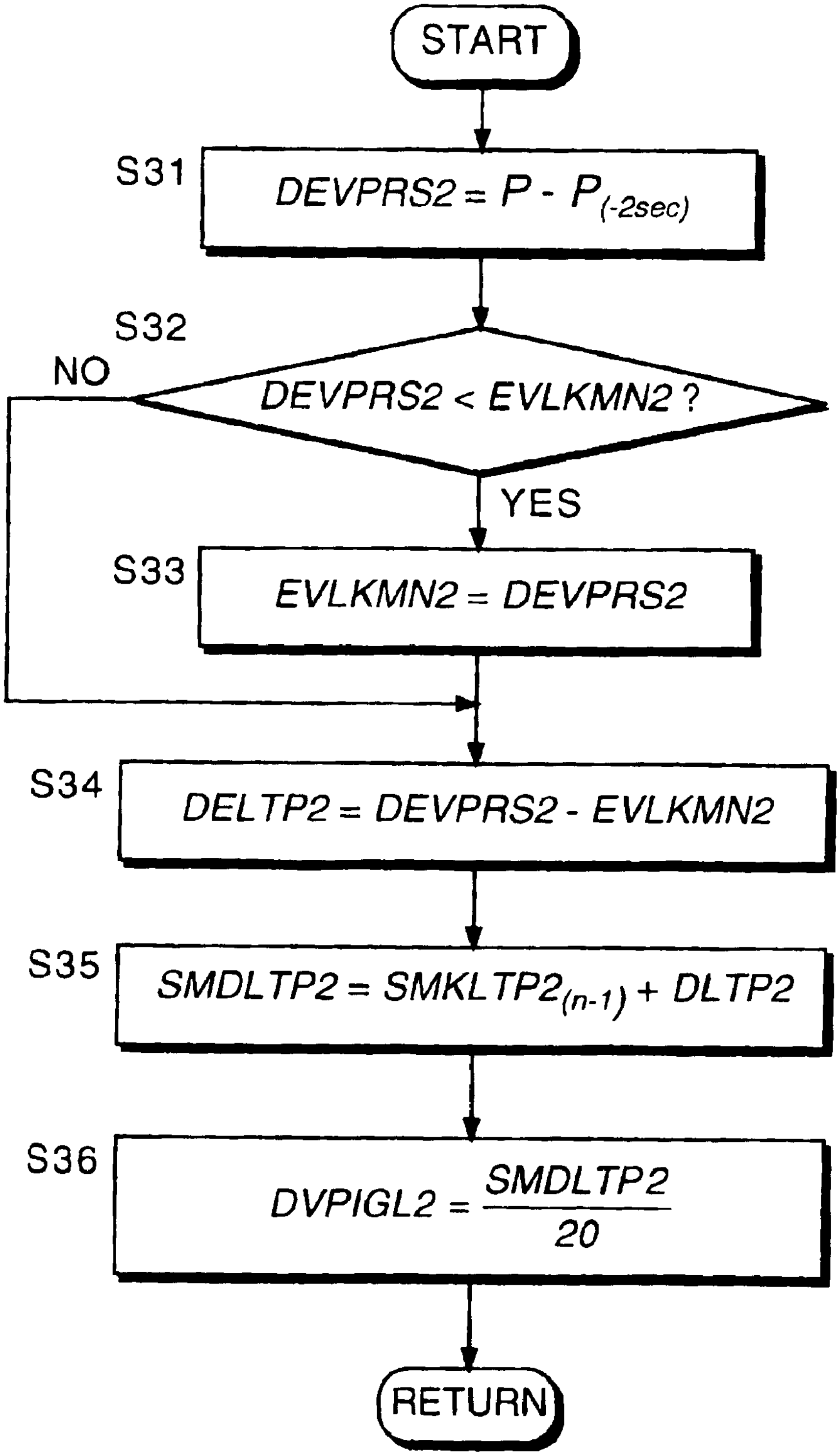
FIG. 9 is a flowchart describing a subroutine for calculating a sloshing correction amount executed by the controller.

In the step S17, the controller 21 calculates the sloshing correction DVPIGL2 using the subroutine shown in FIG. 9.

Referring to FIG. 9, firstly in a step S31, the controller 21 calculates a pressure change rate DEVPRS2 as the difference P–P(–2sec) of the current purge vent pressure P and the purge vent pressure P(–2sec) diagnosed two second previously.

Then in a step S32, the controller 21 determines whether or not the pressure change rate DEVPRS2 is smaller than the minimum value EVLKMN2 of the pressure change rate. The initial value for the minimum value EVLKMN2 for the pressure change rate is set to equal the pressure change rate DEVPRS2. Consequently when the step S32 is performed for the first time, the determination result in the step S32 is negative. However as shown in FIG. 5B, when sloshing does not occur, in the leak-down period, the pressure change rate DEVPRS2 continues to decrease irrespective of the existence of a leak. Therefore on a second or subsequent determination in the step S32, the determination result in the step S32 will be affirmative if sloshing does not occur.

When the determination result in the step S32 is affirmative, the controller 21 updates the minimum value EVLKMN2 for the pressure change rate in a step S33 using the newest pressure change rate DEVPRS2 calculated in the step S31 executed during the subroutine on this occasion. After the process in the step S33, the controller performs the process in the step S34. When the determination result of the step S32 is negative, the controller skips the step S33 and proceeds to the processing of the step S34.

In the step S34, the controller 21 calculates the sloshing equivalence pressure change rate DLTP2 using Equation (1) below.

$$DLTP2 = DEVPRS2 - EVLKMN2 \quad (1)$$

In the following step S35, the controller 21 accumulates the sloshing equivalence pressure change rate DLTP2 over time using Equation (2) below.

$$SMDLTP2 = SMKLTP2_{(n-1)} + DLTP2 \quad (2)$$

where, SMDLTP2=time integral for DLTP2, and $MKLTP2_{(n-1)}$=previous value of SMDLTP2.

Then in a step S36, the controller 21 calculates the sloshing correction amount DVPIGL2 using Equation (3) below.

$$DVPIGL2 = \frac{SMDLTP2}{20} \quad (3)$$

Figure 10:
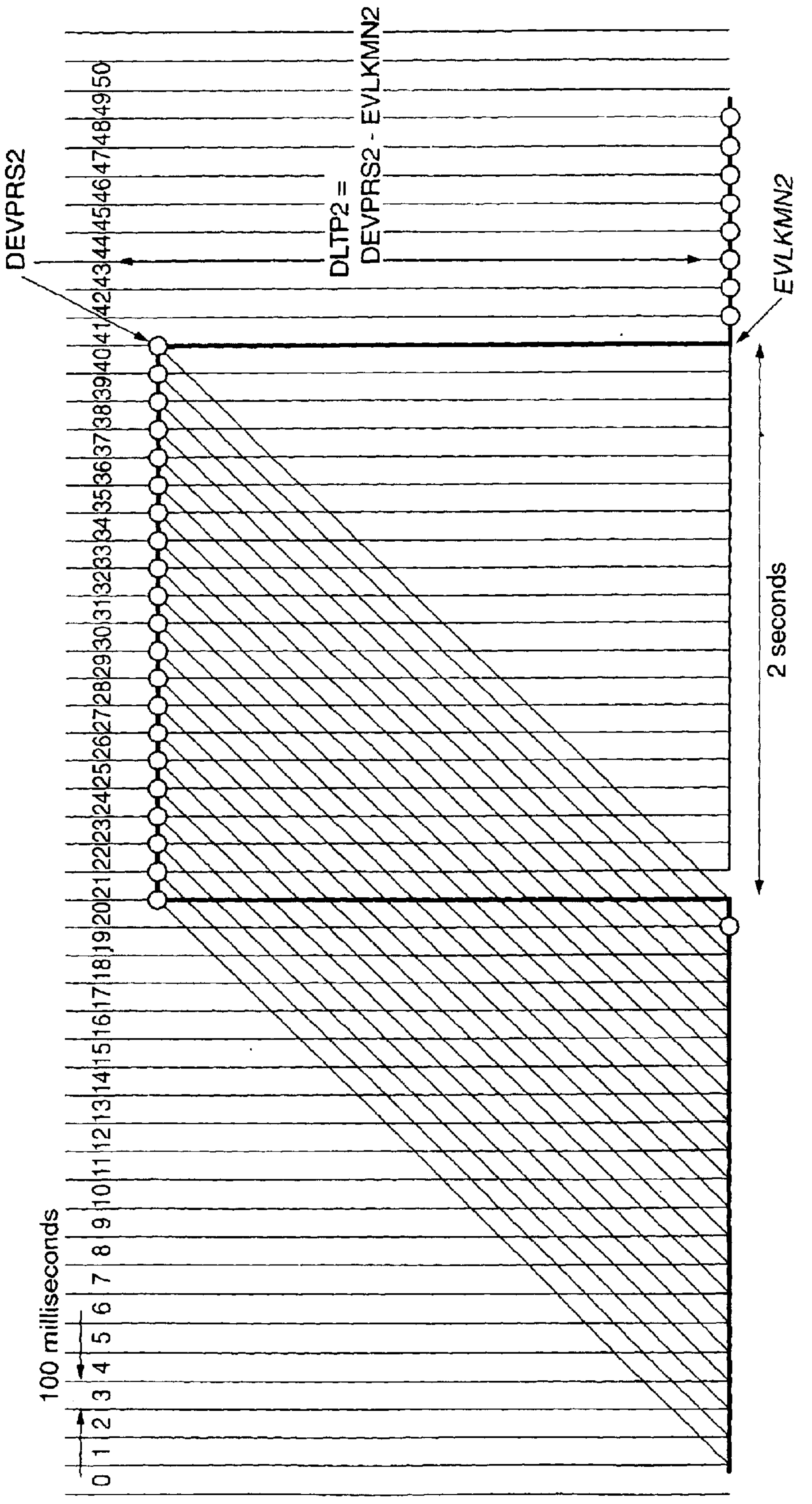
FIG. 10 is a diagram showing the difference between the calculation intervals of a pressure change rate and the accumulation intervals thereof performed by the controller.

Referring to FIG. 10, the meaning of Equation (3) above will be described.

The pressure change rate DEVPRS2 calculated in the step S31 is the pressure difference during a two-second interval as shown in FIG. 10. The time integral SMDLTP2 calculated in the step S35 is a value accumulated at a hundred millisecond intervals. It is necessary to divide SMDLTP2 by 20 as shown in Equation (3) in order to convert SMDLTP2 into a two-second summed value.

In this manner, after the sloshing correction amount DVPIGL2 is calculated, the controller 21 terminates the subroutine.

Next referring to FIG. 8A, after calculating the sloshing correction amount DVPIGL2 in the step S17, the controller 21 compares the sloshing correction amount DVPIGL2 with a slice level SL1. The slice level SL1 is set to equal the minimum value in the trend in the pressure variation during a leak-down period determining the presence of a leak during leak diagnosis according to the prior art technique. Herein, the slice level SL1 is set to 0.04 kPa per second. The value of the slice level SL1 depends on the state of the purge vent and should be determined experimentally.

When the sloshing correction amount DVPIGL2 is greater than the slice level SL1, the controller 21 terminates the routine after setting the leak diagnosis suspension flag to unity in the step S19. When the sloshing correction amount DVPIGL2 is not greater than the slice level SL1, the controller 21 skips the step S19 and terminates the routine.

The initial value of the leak diagnosis suspension flag is zero. The leak diagnosis suspension flag is set to a value of unity in the step S19 and is reset to a value of zero when the engine is restarted.

Returning now to the description of the step S16, when the pressure difference P0–P is less than or equal to DVP4–p3–DVPIGL2, the controller 21 as described above performs the process in the steps S20–S27 as shown in FIG. 8B.

Referring to FIG. 8B, the controller 21 stores the pressure difference P0–P in the memory (RAM) as a leak-down processing final pressure DVP5 in the step S20. The timer value that started counting in the step S14 is stored in the memory (RAM) as a leak-down period DTIME.

Then in the step S21, the controller 21 performs a correction on a quantization error for the sloshing correction amount DVPIGL2 using Equation (4) below. The pressure sensor detects the pressure in the second passage 6 as an analogue value as shown by FIG. 2. However it is not possible for the controller 21 comprising a microcomputer to use the analogue value due to the fact that it is a continuous amount. The controller 21 quantizes the voltage signal input from the pressure sensor 13 and expresses the analogue value as a fixed bit value. As a result, an error occurs when converting the continuous amount into a discrete value. Equation (4) represents the process of correcting the error resulting from the analogue/digital conversion.

$$DVPII = DVPIGL2 - OFST2 \quad (4)$$

where, DVPII=sloshing correction after correction, and

OFST2=offsetting value.

The offsetting value OFST2 is a fixed value calculated experimentally in advance.

Next in the step S22, the controller 21 calculates the leak-down processing final pressure correction DVP5A using Equation (5).

$$DVP5A = DVP5 - DVPII \tag{5}$$

Thereafter in the step S23, the controller 21 calculates the leak diagnosis index DVPBT using Equation (6). The calculation is performed by dividing the difference between the leak-down processing initial pressure DVP4 and the leak-down processing final pressure correction DVP5A by the leak-down period DTIME.

$$DVPBT = \frac{(DVP4 - DVP5A)}{DTIME} \tag{6}$$

Then in the step S24, the controller 21 compares the leak diagnosis index DVPBT with the slice level SL2. When the leak diagnosis index DVPBT is greater than the slice level SL2, the controller 21 determines that a leak exists and sets the leak flag to unity in the step S25. When the leak diagnosis index DVPBT is not greater than the slice level SL2, the controller 21 determines that a leak does not exist and resets the leak flag to a value of zero in the step S26. The initial value of the leak flag is zero.

After the process in the step S25 or the step S26, the controller 21 sets the leak diagnosis termination flag to unity, opens the purge control valve 11 and the drain cut valve 12 in the step S27, and terminates the routine.

Even when sloshing occurs during the leak-down processing period, as long as the sloshing correction amount DVPIGL2 does not exceed the slice level SL1, the above routine allows for fluctuations in the purge vent pressure P resulting from sloshing to be corrected and for leak diagnosis to be performed accurately based on the leak diagnosis index DVPBT using the leak-down processing final pressure correction DVP5A. Since the pull-down period finishes when the pressure difference P0–P is greater than or equal to the fixed value p2, sloshing during the pull-down period has no effect on the leak-down process.

In the above embodiment, leak diagnosis is performed only once if leak diagnosis conditions are satisfied after the engine 10 is started until it is turned off. However it is possible to increase the frequency of the leak diagnosis.

In the above embodiment, the presence of a leak is diagnosed using the leak-down period DTIME and the difference of the leak-down processing initial pressure DVP4 and the leak-down processing final pressure DVP5A. However this invention may be applied to other diagnosis algorithms performing diagnosis operations using the leak-down processing final pressure.

For example, Tokkai 10-274107 published by the Japan Patent Office in 1998 discloses a diagnosis algorithm which determines the presence of a leak based on the leak hole surface area. The leak hole surface area is calculated based on the leak-down processing initial pressure and the leak -down processing final pressure. This diagnosis algorithm allows leak diagnosis accuracy to be increased by eliminating the effect of sloshing by correcting the leak-down processing final pressure using the sloshing correction amount DVPIGL2.

Tokkai 6-159157 published by the Japan Patent Office in 1994 discloses an algorithm for diagnosing a leak based on a pressure sampling value sampled at a fixed period after the startup of the pull-down processing. This algorithm allows for the leak diagnosis accuracy to be increased by eliminating the effect of sloshing by correcting the pressure sampling value using the sloshing correction amount DVPIGL2.

Next referring to FIGS. 11A and 11B and FIGS. 12A–12E, a second embodiment of this invention will be described.

The structure of the hardware in this embodiment is the same as that described with respect to the first embodiment.

In this embodiment, after completing the leak-down process, the controller 21 performs a vapor monitoring process. The vapor monitoring process is described hereafter.

In other words, when the temperature of the fuel tank 1 increases, the pressure in the purge vent from the fuel tank 1 to the purge control valve 11 increases due to the increase in the fuel vapor amount. Consequently an error is incorporated into the diagnosis result when leak diagnosis is performed under such conditions using the leak-down process.

As shown in FIGS. 12A–12E, the controller 21 performs a vapor monitoring process in addition to the conventional leak-down process in order to eliminate the effect of the temperature increase from the leak diagnosis process.

The vapor monitoring process is described hereafter. In other words, after completion of the conventional leak-down process, the drain cut valve 12 is opened and atmospheric pressure P0 is introduced into the purge vent from the fuel tank 1 to the purge control valve 11 during a fixed atmospheric pressure introduction period t4. Thereafter the drain cut valve 12 is closed, the purge vent is sealed and the pressure variation in the purge vent is monitored during a fixed vapor monitoring period t3. The vapor monitoring period t3 is set within a range from 20 seconds to 60 seconds depending on the conditions in the purge vent.

Finally the leak-down processing final pressure DVP5 is corrected based on the monitored pressure variation. When the pressure variation in the vapor monitoring period t3 is excessive, leak diagnosis is cancelled.

Sloshing which occurs during the vapor monitoring period t3 affects the monitored pressure variation and has an adverse effect on the correction accuracy in the correction of the leak-down processing final pressure DVP5. In this embodiment, when sloshing is detected during the vapor monitoring period t3, the pressure increase in the purge vent resulting from sloshing is subtracted from the temperature increase correction amount so as to increase the accuracy of the temperature correction on the leak-down processing final pressure DVP5.

In the same manner as the first embodiment, firstly the controller 21 executes the pull-down process routine of FIG. 7 when the leak diagnosis conditions are satisfied during operation of the engine 10.

Figure 11A:
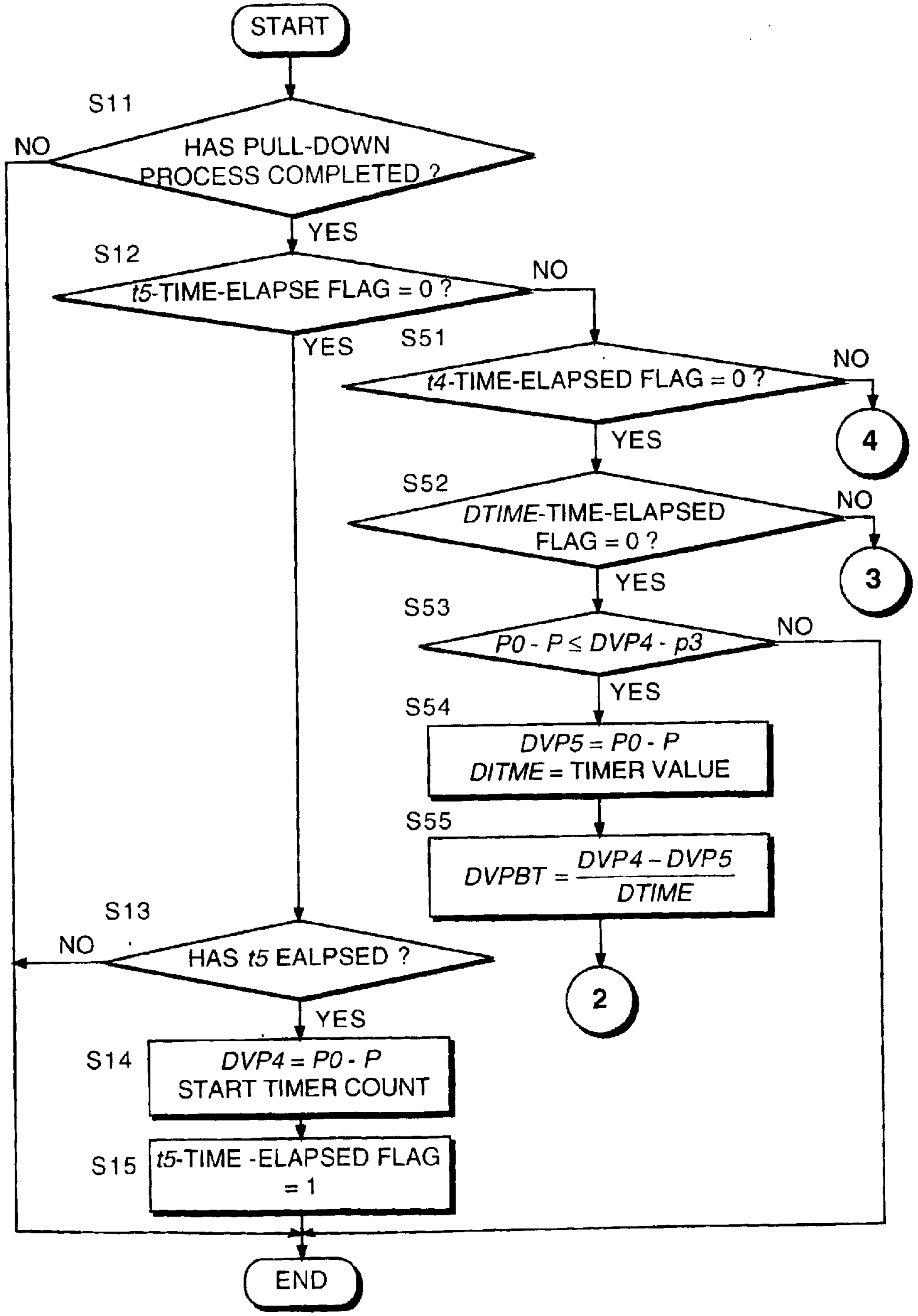
FIGS. 11A and 11B are flowcharts describing a routine for leak-down processing and vapor monitoring processing executed by a controller according to a second embodiment of this invention.
Figure 11B:
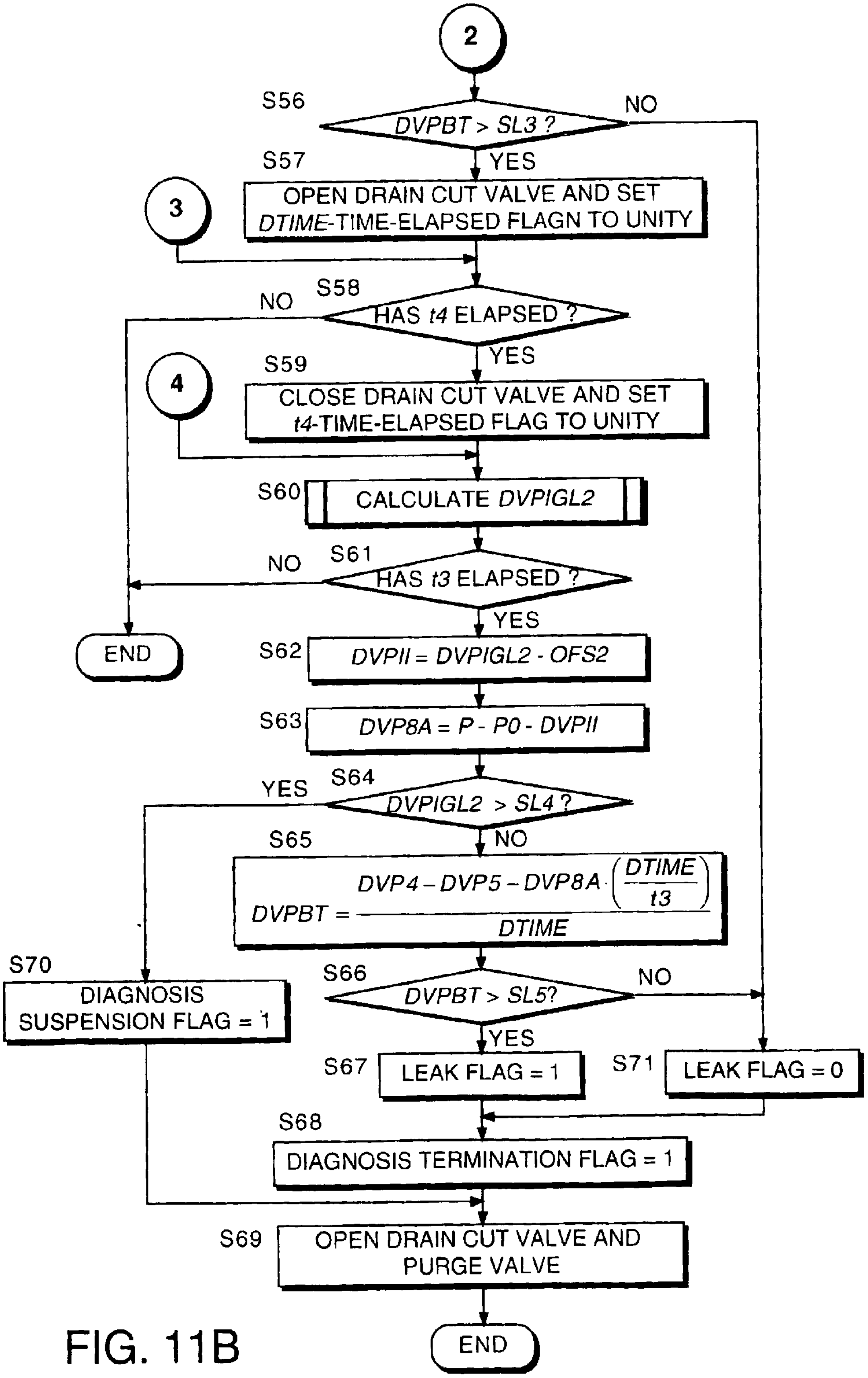

However instead of the leak-down process routine shown in FIGS. 8A and 8B according to the first embodiment, the controller 21 executes a leak-down process and the vapor monitoring process routine shown in FIGS. 11A and 11B at intervals of a hundred milliseconds.

The steps S11–S15 shown in FIG. 11A are the same as the steps S11–S15 in FIG. 8A.

When the t5-time-elapse flag is not zero in the step S12 in FIG. 11A, in other words, when the flag takes a value of unity, the controller 21 determines whether or not a t4-time-elapse flag has a value of zero in a step S51. The t4-time-elapse flag is a flag showing whether or not the introduction of atmospheric pressure P0 into the purge vent performed after the leak-down process is completed. Immediately after the t5-time-elapse flag takes a value of unity, the t4-time-elapse flag is of course zero.

When the t4-time-elapse flag has a value of zero, in a step S52, the controller 21 determines whether or not the DTIME-time-elapse flag has a value of zero. The DTIME-time-elapse flag is a flag which determines whether or not the leak-down process is completed. Immediately after the t5-time-elapse flag takes a value of unity, the DTIME-time-elapse flag has a value of zero.

When the DTIME-time-elapse flag has a value of zero, in a step S53, the controller 21 compares the pressure difference P0–P with DVP4–p3. When the pressure difference P0–P is greater than DVP4–p3, the controller 21 terminates the routine immediately without proceeding to subsequent steps.

In the step S53, when the pressure difference P0–P is less than or equal to DVP4–p3, the controller 21 stores the pressure difference P0–P in the memory (RAM) as a leak-down processing final pressure DVP5. At the same time, the timer value started in the step S14 is stored in the memory (RAM) as the leak-down period DTIME.

Then in the step S55, the controller 21 calculates the leak diagnosis index DVPBT using Equation (7) below.

$$DVPBT = \frac{DVP4 - DVP5}{DTIME} \tag{7}$$

Then the controller 21 compares the leak diagnosis index DVPBT with a slice level SL3 in a step S56 as shown in FIG. 11B. When the leak diagnosis index DVPBT is not greater than the slice level SL3, the controller 21 performs the process in the step S68 after resetting the leak flag to zero in a step S71.

The leak diagnosis index DVPBT calculated in the step S53 is a diagnosis index based on an apparent pressure variation excluding corrections for the temperature increase and the corrections for sloshing. In other words, it corresponds to the diagnosis index obtained from the conventional leak diagnosis algorithm shown in FIGS. 3A–3C and FIGS. 4A–4C. The meaning of the comparison of this value with the slice level SL3 is described hereafter.

The temperature increase described above causes an increase in the purge vent pressure P. As a result, the leak-down processing final pressure DVP5 which is equal to the pressure difference P0–P decreases and the leak diagnosis index DVPBT increases. Even when the purge vent pressure P has been increased as a result of a temperature increase or sloshing, it is still possible to determine that there are no leaks without performing the vapor monitoring process as long as the leak diagnosis index DVPBT does not exceed the slice level SL3.

In this event, the controller 21 performs the process in the step S68 without performing the vapor monitoring process.

When the leak diagnosis index DVPBT is larger than the slice level SL3, the controller 21 performs the process in a step S57 and subsequent steps. The process in the step S57 and subsequent steps correspond to the process comprising the atmospheric pressure introduction period t4 and the vapor monitoring period t3.

In the step S57. the controller 21 opens the drain cut valve 12 and sets the DTIME-time-elapse flag to unity. The DTIME-time-elapse flag shows that the leak-down period DTIME has completed.

Then in a step S58, it is determined whether or not the time elapsed after opening the drain cut valve 12 has reached t4.

When the time elapse has not reached t4, the controller 21 terminates the routine without performing further steps.

In the step S52 above, when the DTIME-time-elapse flag does not have a value of zero, in other words, when the DTIME-time-elapse flag has a value of unity, the process in the steps S52–S57 is skipped and the determination in the step S58 is performed. As a result, after the leak-down period DTIME is finished, the drain cut valve 12 is maintained in an open position until the atmospheric pressure introduction period t4 has elapsed. Consequently the introduction of atmospheric pressure into the purge vent is continued.

Figures 12A, 12B, 12C, 12D, 12E:
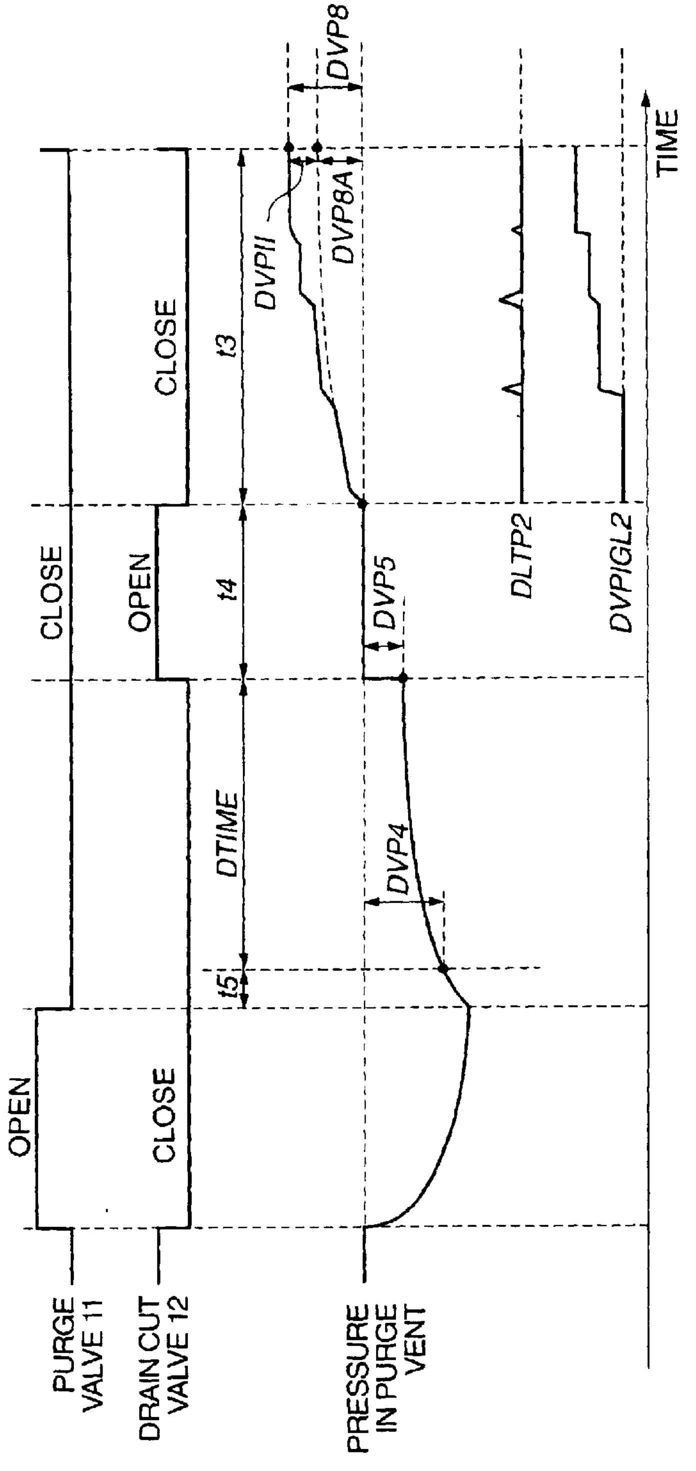
FIGS. 12A–12E are timing charts showing a correction of sloshing performed by the controller according to the second embodiment of this invention.

When the elapsed time reaches t4 in the step S58, the controller 21 closes the drain cut valve 12 and the t4-time-elapse flag is set to unity in a step S59. In this manner, the atmospheric pressure introduction period t4 is finished as shown in FIG. 12C.

In the steps after the next step S60, the vapor monitoring process is performed. In the step S51 described above, when the t4-time-elapse flag does not have a value of zero, in other words, when the t4-time-elapse flag has a value of unity, the process in the steps S52–S59 is skipped and the process in the step S60 is performed. As a result after the atmospheric pressure introduction period t4 is finished, the vapor monitoring process in the step S60 and subsequent steps is repeated.

In the step S60, the controller 21 calculates the sloshing correction amount DVPIGL2 using the subroutine of FIG. 9 in the same manner as the first embodiment. The calculated sloshing correction amount DVPIGL2 is a sloshing correction amount for the vapor monitoring period t3 as shown in FIG. 12E which is calculated using the sloshing equivalence pressure change rate DLTP2 during the vapor monitoring period as shown in FIG. 12D. This value does not equal the sloshing correction amount for the leak-down period calculated in the first embodiment.

In the next step S61, it is determined whether or not the time elapse after closing the drain cut valve 12 has reached the vapor monitoring period t3. When the vapor monitoring period t3 has not been reached, the controller 21 terminates the routine without performing subsequent steps. During the vapor monitoring period t3, the calculation of the sloshing correction amount DVPIGL2 is thereby repeated.

When the elapsed time in the step S61 has reached t3, in a step S62, the controller 21 calculates a sloshing correction amount DVPII after performing a correction using the same method as that described in the step S21 of FIG. 8B. The calculated sloshing correction amount DVPII is a sloshing correction amount related to the vapor monitoring period and is not the same as the sloshing correction amount during the leak-down period calculated in the first embodiment.

Then in a step S63, the controller 21 calculates the temperature increase correction amount DVP8A using Equation (8) below.

$$DVP8A = P - P0 - DVPII \tag{8}$$

In contrast to adding the correction amount DVPII in the Equation (5) in the first embodiment. Equation (8) subtracts the correction amount DVPII. This is in order to correct the positive pressure as shown in FIG. 12C in this embodiment in contrast to correcting the negative pressure in the first embodiment. Thus calculating a temperature increase correction amount DVP8A which eliminates the effect of sloshing makes it possible to correctly understand the effect of the temperature increase on pressure variation during the vapor monitoring period.

Next in a step S64, the sloshing correction amount DVPIGL2 for the vapor monitoring period calculated in the step S60 is compared with a slice level SL4. When the sloshing correction amount DVPIGL2 is greater than the slice level SL4, the leak diagnosis suspension flag is set to unity in a step S70. After the process of the step S70, the controller 21 performs the process in a step S69. In the step S64, when the sloshing correction amount DVPIGL2 is not greater than the slice level SL4, the controller 21 calculates the leak diagnosis index DVPBT using Equation (9) in a step S65.

$$DVPBT = \frac{DVP4 - DVP5 - DVP8A \cdot \left(\frac{DTIME}{t3}\right)}{DTIME} \tag{9}$$

In the above equation (9), DVP8A is multiplied by (DTIME/t3) in order to convert the temperature increase correction amount for the vapor monitoring period t3 to that for the leak-down period DTIME. The leak diagnosis index DVPBT calculated in the step S55 is a value which does not include a correction for a temperature increase. In contrast, the leak diagnosis index DVPBT calculated from Equation (9) is a value which includes a correction for temperature increase. Thus the leak diagnosis index DVPBT calculated in the step S65 is a value accurately reflecting the leak state of the purge vent from the fuel tank 1 to the purge control valve 11.

In a step S66, the controller 21 compares the leak diagnosis index DVPBT obtained in the step S65 with a slice level SL5. The slice level SL5 is preferably set to a value from 0.8 kPa to 1.1 kPa.

When the leak diagnosis index DVPBT is not greater than the slice level SL5, in a step S71, the controller 21 resets the leak flag to zero. After the process in the step S71, the controller 21 performs the process in the step S68.

In contrast, when the leak diagnosis index DVPBT is greater than the slice level SL5, in a step S67. the controller 21 sets the leak flag to unity. After the process in the step S67, the controller 21 performs the process in the step S68.

In the step S68, the controller 21 sets the leak diagnosis termination flag to unity.

Then in the step S69, the controller 21 opens the purge control valve 11 and the drain cut valve 12. After the process in the step S69, the controller 21 terminates the routine.

This embodiment applies this invention to correct a vapor monitoring process final pressure DVP8 when sloshing occurs during the vapor monitoring period. In this embodiment, if the steps S16–S23 of the first embodiment are executed instead of the steps S53–S55, it is possible to further increase the leak diagnosis accuracy by eliminating both the effect of sloshing during the leak-down period and the effect of sloshing during the vapor monitoring period.

In this embodiment, although the vapor monitoring period is provided after the leak-down period, it is possible to set the vapor monitoring period before the pull-down period.

The contents of Tokugan 2002-280628, with a filing date of Sep. 26, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in each of the embodiments above, this invention is applied to a leak-down process or a vapor monitoring period. However this invention is not limited in this respect. It is also possible to obtain an accurate monitoring result eliminating the effect of sloshing by applying this invention to monitoring of any fuel vapor pressure variation performed with respect to conditions under which the fuel vapor pressure increases and the pressure change rate in the fuel vapor decreases.

In each of the above embodiments, although the purge vent pressure P is detected using the pressure sensor 13, the purge vent pressure P may be determined by any other means. This invention can be applied to any fuel vapor processing device using the purge vent pressure P in order to perform leak diagnosis within the scope of the claims.

The embodiments of this invention in which an exclusive property or privilege is claimed are defined as follows:

What is claimed is:

1. A fuel vapor pressure monitoring device monitoring a pressure increase in a purge vent between a fuel tank and an intake passage of an engine, in a sealed state, the device comprising:

a sensor which detects a pressure in the purge vent; and a programmable controller programmed to:

repeatedly calculate a pressure change rate in the purge vent in the sealed state at predetermined time intervals;

update a minimum value for the pressure change rate, calculate a difference of the minimum value and the pressure change rate, calculate an error equivalence amount based on a time integral of the difference, the error equivalence amount corresponding to an error amount in the pressure in the purge vent in the sealed state due to sloshing in the fuel tank; and calculate a corrected pressure which corresponds to a pressure when sloshing does not occur, from the pressure in the purge vent in the sealed state and the error equivalence amount.

2. The monitoring device as defined in claim 1, wherein the pressure increase in the purge vent in the sealed state is a pressure increase in which a pressure change rate decreases.

3. The monitoring device as defined in claim 1, wherein the purge vent comprises a first passage connected to the fuel tank, a canister connected to the first passage, the canister comprising a filter adsorbing fuel vapor and a vent hole opening to the atmosphere, a second passage connecting the canister with the intake passage, a drain cut valve which can close the vent hole and a purge control valve which can close the second passage, and the controller is further programmed to seal the purge vent by closing the drain cut valve and the purge control valve.

4. The monitoring device as defined in claim 1, wherein the controller is further programmed to regulate the pressure in the purge vent to a first negative pressure using a negative intake pressure of the engine, and determine the presence of a fuel vapor leak in the purge passage using the corrected pressure when a leak-down period has elapsed after regulating the pressure in the purge vent to the first negative pressure.

5. The monitoring device as defined in claim 4, wherein the controller is further programmed to determine that the leak-down period has elapsed when the absolute value of a negative pressure in the purge vent equals a value calculated by subtracting the time integral and a fixed pressure from the absolute value of the first negative pressure.

6. The monitoring device as defined in claim 5, wherein the fixed pressure is set in a range from 0.5 kilopascals to 2.0 kilopascals.

7. The monitoring device as defined in claim 4, wherein the controller is further programmed not to determine the presence of a fuel vapor leak in the purge passage when the time integral exceeds a fixed amount.

8. The monitoring device as defined in claim 4, wherein the controller is further programmed to calculate a leak diagnosis index by dividing a difference of the corrected pressure when the leak-down period has elapsed and the first negative pressure by the leak-down period, and determine that there is a fuel vapor leak when the leak diagnosis index is greater than a fixed value.

9. A fuel vapor pressure monitoring device monitoring a pressure increase in a purge vent between a fuel tank and an intake passage of an engine, in a sealed state, the device comprising:

a sensor which detects a pressure in the purge vent; and a programmable controller programmed to:

calculate a pressure variation in the purge vent;

calculate an error equivalence amount from the pressure variation in the purge vent, the error equivalence amount corresponding to an error amount in the pressure in the purge vent in the sealed state due to sloshing in the fuel tank;

calculate a corrected pressure which corresponds to a pressure when sloshing does not occur, from the pressure in the purge vent in the sealed state and the error equivalence amount;

seal the purge vent in a state where the pressure in the purge vent is equal to atmospheric pressure;

determine whether or not a fixed vapor monitoring period has elapsed in a sealed state; and calculate the corrected pressure when the fixed vapor monitoring period has elapsed, as a vapor monitoring period temperature increase correction amount expressing a pressure variation resulting from a temperature variation during the vapor monitoring period.

10. The monitoring device as defined in claim 9, wherein the controller is further programmed to regulate the pressure in the purge vent other than during the vapor monitoring period to a first negative pressure using a negative intake pressure of the engine, seal the purge vent in a state where the pressure in the purge vent is equal to the first negative pressure, count up a leak-down period which is a required time for the pressure in the purge vent to increase from the first negative pressure to a fixed second negative pressure, calculate a differential pressure correction value by correcting a differential pressure of the first negative pressure and the second negative pressure based on the vapor monitoring period temperature increase correction amount, the vapor monitoring period and the leak-down period, and determine the presence of a fuel vapor leak in the purge vent based on a leak diagnosis index calculated by dividing the differential pressure correction value by the leak-down period.

11. The monitoring device as defined in claim 10, wherein the controller is further programmed to set the leak-down period before the vapor monitoring period.

12. The monitoring device as defined in claim 10, wherein the controller is further programmed to calculate a leak-down period temperature increase correction amount by multiplying the ratio of the leak-down period and the vapor monitoring period by the vapor monitoring period temperature increase correction amount, and calculate the differential pressure correction value by correcting the differential pressure of the first negative pressure and the second negative pressure by the leak-down period temperature increase correction amount.

13. The monitoring device as defined in claim 10, wherein the controller is further programmed to determine that there is a fuel vapor leak when the leak diagnosis index is greater than a fixed value.

14. The monitoring device as defined in claim 1, wherein the controller is further programmed to apply a correction for a quantization error resulting from quantizing the pressure detected by the sensor when calculating the error equivalence amount from the pressure variation in the purge vent.

15. A fuel vapor pressure monitoring device monitoring a pressure increase in a purge vent between a fuel tank and an intake passage of an engine, in a sealed state, the device comprising:

means for determining a pressure in the purge vent;

means for repeatedly calculating a pressure change rate in the purge vent in the sealed state at predetermined time intervals;

means for updating a minimum value for the pressure change rate, means for calculating a difference of the minimum value and the pressure change rate, means for calculating an error equivalence amount based on a time integral of the difference, the error equivalence amount corresponding to an error amount in the pressure in the purge vent in the sealed state due to sloshing in the fuel tank; and means for calculating a corrected pressure which corresponds to a pressure when sloshing does not occur, from the pressure in the purge vent in the sealed state and the error equivalence amount.

16. A fuel vapor pressure monitoring method monitoring a pressure increase in a purge vent between a fuel tank and an intake passage of an engine, in a sealed state, the method comprising:

determining a pressure in the purge vent;

repeatedly calculating a pressure change rate in the purge vent in the sealed state at predetermined time intervals;

updating a minimum value for the pressure change rate, calculating a difference of the minimum value and the pressure change rate, calculating an error equivalence amount based on a time integral of the difference, the error equivalence amount corresponding to an error amount in the pressure in the purge vent in the sealed state due to sloshing in the fuel tank; and calculating a corrected pressure which corresponds to a pressure when sloshing does not occur, from the pressure in the purge vent in the sealed state and the error equivalence amount.

* * * * *